(12) United States Patent
Haefner et al.

(10) Patent No.: US 10,823,189 B2
(45) Date of Patent: Nov. 3, 2020

(54) HOT AIR FEED WHEEL

(71) Applicant: Eberspächer Climate Control Systems GmbH & Co. KG, Esslingen (DE)

(72) Inventors: Michael Haefner, Stuttgart (DE); Hans Jensen, Dettingen (DE); Oleg Dering, Stuttgart (DE); Henry Rösch, Sindelfingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 167 days.

(21) Appl. No.: 15/868,184

(22) Filed: Jan. 11, 2018

(65) Prior Publication Data

US 2018/0202454 A1 Jul. 19, 2018

(30) Foreign Application Priority Data

Jan. 17, 2017 (DE) .................. 10 2017 100 800

(51) Int. Cl.
| | |
|---|---|
| *F04D 29/28* | (2006.01) |
| *F04D 29/02* | (2006.01) |
| *F04D 29/053* | (2006.01) |
| *F04D 29/66* | (2006.01) |
| *B60H 1/22* | (2006.01) |

(52) U.S. Cl.
CPC ......... *F04D 29/281* (2013.01); *B60H 1/2212* (2013.01); *F04D 29/023* (2013.01); *F04D 29/053* (2013.01); *F04D 29/668* (2013.01); *B60H 2001/2281* (2013.01)

(58) Field of Classification Search
CPC .... F04D 29/023; F04D 29/053; F04D 29/281; F04D 29/20; F04D 29/26; F04D 29/263; F04D 29/266; F04D 29/663; F04D 29/664; F04D 29/668; F24H 3/06; F24H 3/065; B60H 1/00471; B60H 1/2203; B60H 1/2212; F16D 3/50

USPC ...................................... 416/186 R
See application file for complete search history.

(56) References Cited

U.S. PATENT DOCUMENTS

| | | | | |
|---|---|---|---|---|
| 7,121,799 | B2 * | 10/2006 | Kim .................. | F04D 29/023 416/186 R |
| 9,822,648 | B2 * | 11/2017 | Iyer ....................... | F01D 5/30 |
| 2002/0110455 | A1 | 8/2002 | Kim et al. | |
| 2004/0202539 | A1 | 10/2004 | Blank et al. | |
| 2004/0223845 | A1 * | 11/2004 | Caplan ............... | F04D 29/329 415/173.1 |

(Continued)

FOREIGN PATENT DOCUMENTS

| | | |
|---|---|---|
| CN | 1403720 A | 3/2003 |
| CN | 2761893 Y | 3/2006 |
| CN | 102245905 A | 11/2011 |

(Continued)

*Primary Examiner* — Woody A Lee, Jr.
*Assistant Examiner* — Justin A Pruitt
(74) *Attorney, Agent, or Firm* — McGlew and Tuttle, P.C.

(57) ABSTRACT

A hot air feed wheel, for a vehicle heater, includes a hub (44) to fix the hot air feed wheel (22) to a drive shaft and a feed area (50), adjacent to the hub (44), in a transition area (48). A plurality of feed blades (36) are arranged following one another about a feed wheel longitudinal axis (L) in the circumferential direction. The transition area (48) includes a plurality of connection webs (66) following one another about the feed wheel longitudinal axis (L) in the circumferential direction.

21 Claims, 6 Drawing Sheets

(56) References Cited

U.S. PATENT DOCUMENTS

2013/0192581 A1* 8/2013 Haefner ................ F04D 23/008
126/77
2015/0361806 A1* 12/2015 Roach ....................... F02C 7/04
415/202

FOREIGN PATENT DOCUMENTS

| CN | 205154746 U | 4/2016 |
|----|---|---|
| DE | 44 09 629 A1 | 9/1994 |
| DE | 197 54 369 A1 | 7/1998 |
| DE | 199 05 075 A1 | 8/2000 |
| DE | 101 22 516 A1 | 11/2002 |
| DE | 19905075 C2 | 5/2003 |
| DE | 20 2004 015 442 U1 | 2/2006 |
| RU | 2550720 C2 | 5/2015 |

* cited by examiner

Fig. 1 (State of the Art)

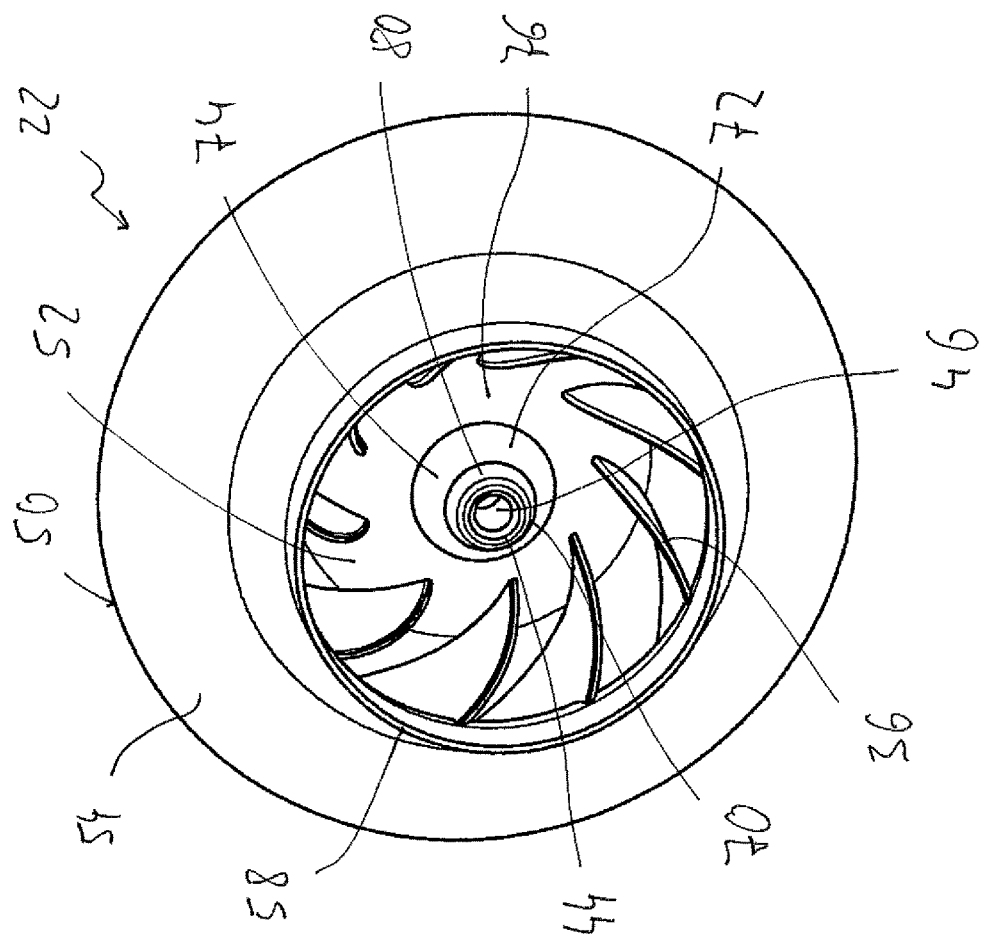
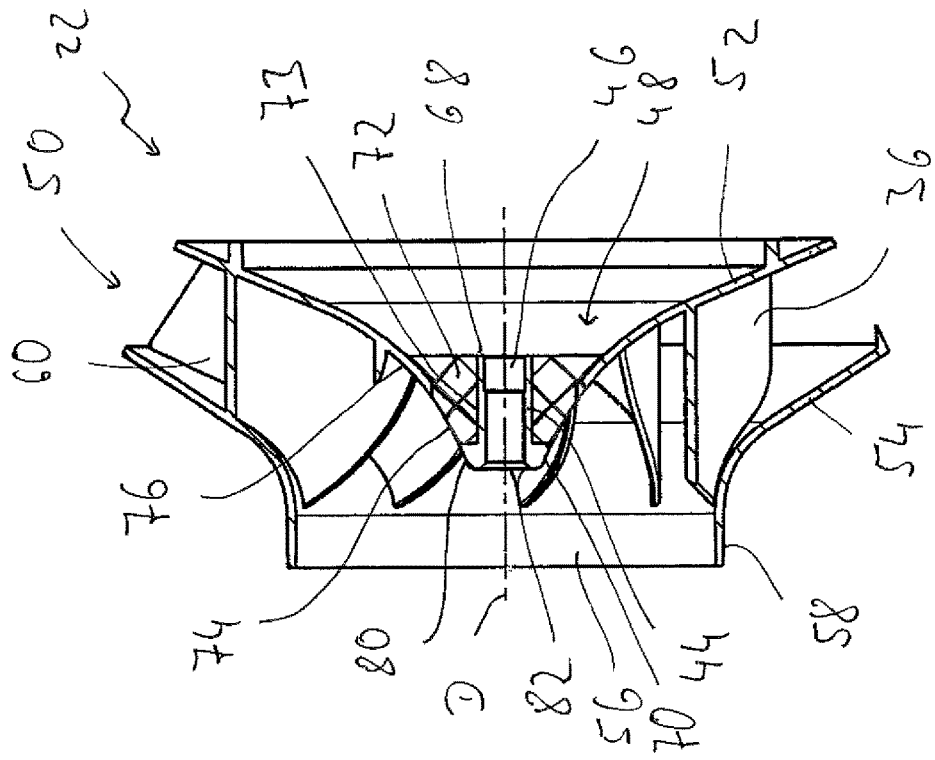

HOT AIR FEED WHEEL

CROSS REFERENCE TO RELATED APPLICATIONS

This application claims the benefit of priority under 35 U.S.C. § 119 of German Application DE 10 2017 100 800.4, filed Jan. 17, 2017, the entire contents of which are incorporated herein by reference.

FIELD OF THE INVENTION

The present invention pertains to a hot air feed wheel for a vehicle heater, comprising a hub to fix the hot air feed wheel to a drive shaft and a feed area adjacent to the hub in a transition area with a plurality of feed blades arranged following one another about a feed wheel longitudinal axis in the circumferential direction.

BACKGROUND OF THE INVENTION

A vehicle heater with a hot air feed wheel with such a configuration is known from DE 20 2004 015 442 U1. This vehicle heater 10, which is shown in FIG. 1, is used to heat the air to be admitted, for example, into a vehicle interior and comprises a blower area 14 and a burner area 15 in a housing 12. The blower area 14 comprises a combustion air blower 16, which is configured as a side channel blower in the exemplary embodiment shown, with a combustion air feed wheel 18 and a hot air blower 20 with a hot air feed wheel 122. The hot air feed wheel 122 is supported at a first axial end area of a motor shaft 24 of a blower motor 26, which is configured as an electric motor. The combustion air feed wheel 18 is supported at the second axial end area of the motor shaft 24. During the operation of the blower motor 26, the motor shaft 24 rotates about a rotation axis D, so that the hot air feed wheel 122 and the combustion air feed wheel 18 also rotate about this rotation axis. In this connection, combustion air is fed by the combustion air feed wheel 18 in the direction towards a combustion chamber assembly unit 28 of the burner area 15 and is burned therein with fuel likewise fed into the combustion chamber assembly unit 28. The combustion waste gases formed during this combustion flow along a flame tube 30 and along the inner surface of a heat exchanger housing 32 to a combustion waste gas outlet 34. The hot air fed by the hot air feed wheel 122 or by feed blades 136 provided on it flows in the interior of the housing 12 along the outer side of the blower motor 26 from a hot air inlet opening 38 to a hot air outlet opening 40 formed in the area of the heat exchanger housing 32. In this connection, the hot air flows around the outer side of the heat exchanger housing 32, especially heat transfer ribs 42 also provided on it, and thus leaves the vehicle heater 10 in the area of the hot air outlet opening 40 in the heated state.

The hot air feed wheel 122 is configured with a hub 144 with a central opening 146 formed in it. The first axial end area of the motor shaft 24 is inserted into this central opening 146, for example, by press fit, so that a stable connection of the hot air feed wheel 122 to the motor shaft 24 is guaranteed. The hub 144 is connected to a feed area 150, following radially outwards, of the feed wheel in a transition area 48 adjacent to the hub 144 in the circumferential direction without interruptions. The feed area 150 comprises a first wall 152, which has an umbrella-like or hollow frustoconical configuration and is located further removed from the hot air inlet opening 38 and a second wall 154 having a likewise essentially umbrella-like configuration located at an axial distance thereto and closer to the hot air inlet opening 38. In a central area of the second wall 154, this second wall passes over into an essentially cylindrical section 158 to provide a hot air receiving opening 156. Between the two walls 152, 154, the feed blades 136 arranged following one another in the circumferential direction extend from radially inwards to radially outwards, so that a hot air feed duct 160 is formed between the two feed blades 136 each following one another in the circumferential direction, the first wall 152 and the second wall 154. During the rotary operation, the air entering in the area of the hot air inlet opening 38 into the housing 12 and in the area of the hot air receiving opening 156 into the hot air feed wheel 122 is fed radially outwards due to the feed action of the feed blades 136 and is discharged under high pressure in the radially outer circumferential area of the hot air feed wheel 122.

The hot air feed wheel 122 is provided as an integral component with the hub 144, the transition area 48 and the feed area 150 in this known configuration. Due to the transition area 48 connecting the hub 144 to the feed area 150 and passing through without interruptions in the circumferential direction, it is guaranteed that there is no loss of hot air entering into the hot air feed wheel 122 in the transition between the first wall 152 and the hub 144, i.e., all air entering into the hot air feed wheel 122 in the direction of the rotation axis D is deflected radially outwards and is fed into the interior of the housing 12.

SUMMARY OF THE INVENTION

The object of the present invention is to provide a hot air feed wheel for a vehicle heater, in which the transmission of vibrations of a blower motor to the feed area of the hot air feed wheel is essentially suppressed.

According to the present invention, this object is accomplished by a hot air feed wheel for a vehicle heater, comprising a hub to fix the hot air feed wheel to a drive shaft and a feed area adjacent to the hub in a transition area with a plurality of feed blades arranged following one another about a feed wheel longitudinal axis in the circumferential direction.

The hot air feed wheel according to the present invention is characterized in that the transition area comprises a plurality of connection webs following one another about the feed wheel longitudinal axis in the circumferential direction.

Due to the configuration of the transition area with a plurality of connection webs connecting the hub to the feed area, the flexibility of the feed wheel is increased considerably in this area. Vibrations generated at a motor shaft of a blower motor and possibly transmitted into the hub area are muffled in the transition area because of the vibration isolation provided by the connection webs and are essentially not transmitted to the feed area. Thus, the risk that such vibrations in the feed area may thus lead to a corresponding vibration excitation of the fed hot air is essentially ruled out.

For a configuration of the hot air feed wheel, which can be manufactured in an especially simple manner, but nevertheless embodies the desired vibration isolation functionality, it is proposed that the feed area be made in one piece with the hub and the connection webs. In particular, the feed area with the hub and with the connection webs may be configured in this case as a cast plastic part, and preferably a cast plastic part made of thermoplastic elastomer material.

In order to avoid an impairment of the feed efficiency of the hot air feed wheel, it is further proposed that intermediate spaces formed in the transition area between the hub, the feed area and the connection webs be filled at least partly, preferably completely with filler.

An impairment of the vibration isolation functionality of the transition area provided in the feed wheel configured according to the present invention due to the filler can be avoided by the filler having a greater modulus of elasticity than the material of which the hub is made or/and the material of which the connection webs are made or/and the material of which the feed area is made. This means that the filler has a greater elasticity, i.e., may experience a greater deformation when force is applied and thus is more easily deformable than, for example, material used to make the feed area.

The hot air feed wheel may be configured, for example, to provide an efficient feed operation such that the feed area comprises a first wall with a central hub connection opening, which first wall is connected to the hub by means of the connection webs and has a an umbrella-like configuration, and a second wall with a central hot air receiving opening, which second wall is arranged at an axial distance to the first wall and has an umbrella-like configuration, wherein the feed blades extend from radially inwards to radially outwards between the first wall and the second wall such that a hot air feed duct open to the hot air receiving opening is defined by two feed blades following one another in the circumferential direction, the first wall and the second wall, respectively.

In order to be able to provide a flush connection of the hub to the feed area by means of the filler in this case, it is further proposed that the hub extend through the hub connection opening.

The flush connection of the filler to the feed area or the hub essentially ruling out an impairment of the hot air flow may be achieved, for example, by the filler providing a connecting surface oriented facing the hot air receiving opening and extending between the hub and the first wall, wherein the connecting surface is connected in an essentially ridgeless or/and kink-free manner to a surface of the first wall facing the feed blades in its radially outer end area or/and in an essentially ridgeless or/and kink-free manner to the hub, preferably to an outer circumferential surface of the hub, in its radially inner end area.

The present invention further pertains to a vehicle heater, comprising a blower motor with a motor shaft rotatable about a rotation axis, wherein a hot air feed wheel with the configuration according to the present invention is supported at a first axial end area of the motor shaft. A combustion air feed wheel may be supported at a second axial end area of the motor shaft.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a longitudinal sectional view of the hot air feed wheel of FIG. 2 corresponding to FIG. 5 with filler provided in a transition area, cut between two connection webs following one another in the circumferential direction; and FIG. 7 is a perspective view of the feed wheel in FIG. 5, viewed from the side to be positioned facing away from a blower motor.

DESCRIPTION OF THE PREFERRED EMBODIMENTS

Figure 1:
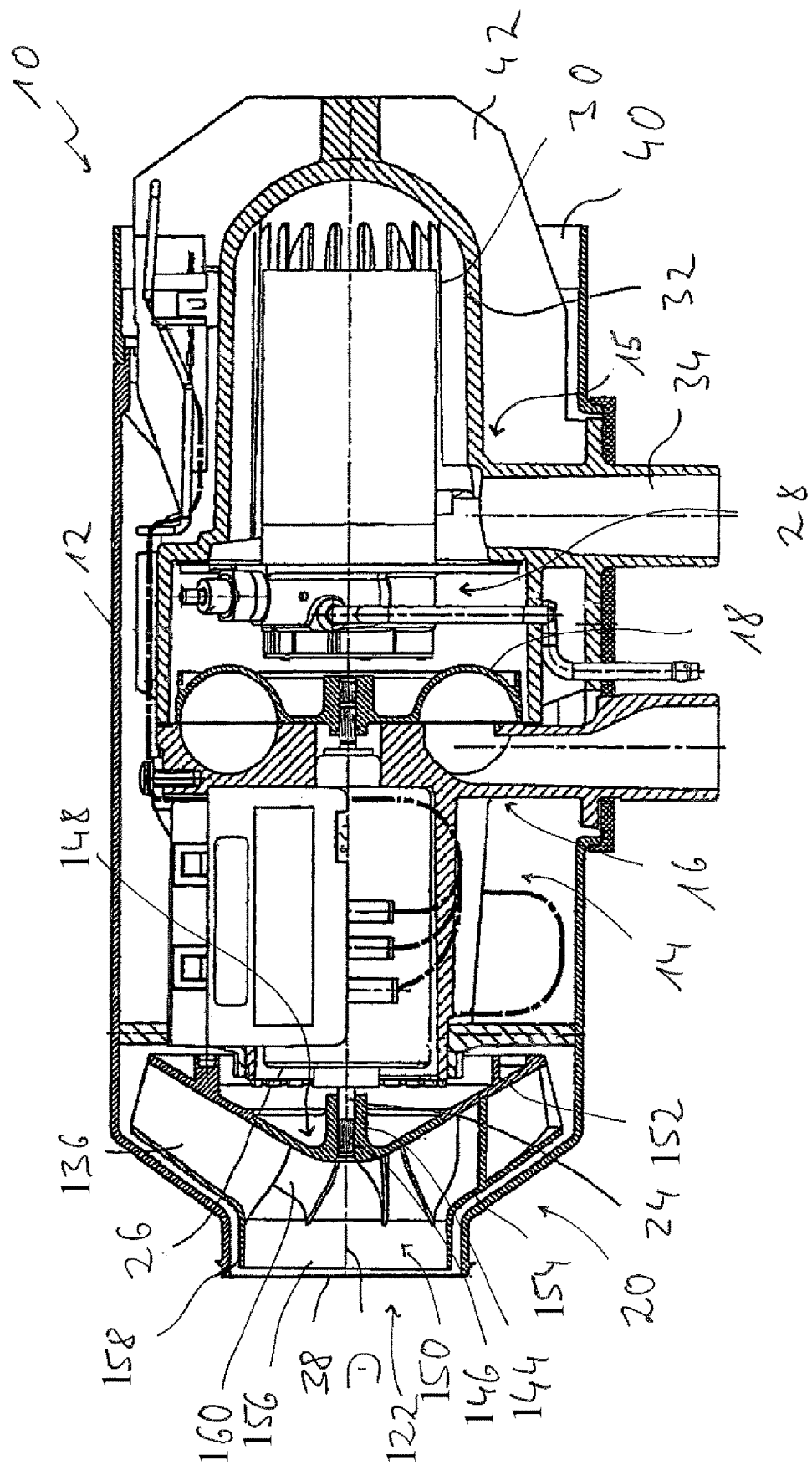
FIG. 1 is a longitudinal sectional view of a vehicle heater known from the state of the art.

Referring to the drawings, FIGS. 2-7 show a configuration of a hot air feed wheel 22 configured according to the present invention that is described in detail below with reference to FIGS. 2-7. The hot air feed wheel 22 according to the invention can replace the hot air feed wheel 122 of a vehicle heater 10 shown in FIG. 1. For the configuration of such a vehicle heater with the hot air feed wheel 22 according to the invention, reference may be made to the above statements made with regard to the vehicle heater shown in FIG. 1.

FIGS. 2 through 7 show a hot air feed wheel 22 which is configured according to the principles of the present invention. This hot air feed wheel 22 is configured with two walls 52, 54, which have an umbrella-like or hollow frustoconical configuration and are located essentially axially opposite one another or are arranged at an axial distance to one another. The second wall 54 passes over into an essentially cylindrical section 58 in a central area and there provides a hot air receiving opening 56. Feed ducts 60, which extend bent at an angle downstream from radially inwards to radially outwards in the direction of the feed wheel longitudinal axis essentially also corresponding to the rotation axis D, are formed between feed blades 36 following one another in the circumferential direction and the two walls 52, 54.

The first wall 52 has in a central area with a hub connection opening 64, through which extends a hub 44, which is configured as essentially uncoupled from the first wall 52. A transition area 48, via which the hub is connected to the first wall 52, comprises a plurality of connection webs 66, which extend radially outwards from the hub 44 and are connected in a radially outer end area to the first wall 52. The connection webs 66 are arranged in a star-like or cross-like configuration and extend essentially in the radial direction, starting from an axial end area 68 of the hub 44 to be positioned facing a blower motor.

The hub 44 may be made in one piece with the transition area 48, i.e., the connection webs 66, and a feed area 50, i.e., the two walls 52, 54 and the feed blades 36 located between them, i.e., may be provided by an integral block of material and may be manufactured, for example, from plastic material, preferably from thermoplastic elastomer material in a casting method, for example, in a die-casting method.

Due to the connection of the hub 44 to the first wall 52 and thus to the feed area 50 by means of the connection webs 66, a vibration isolation is achieved between the hub 44 and the feed area 50. Vibrations generated in the area of the motor shaft 24 at an opening 24 of the hub 44 or introduced into the hub 44, especially also tumblings, are thus essentially not transmitted to the first wall 52 and thus to the feed area 50. In this connection, the number and the cross-sectional dimensioning or also the shape of the connection webs 66 adapted to the magnitude and frequency of the vibrations to be expected in the area of the motor shaft 24 may be selected to achieve an optimal vibration isolation between the hub 44 and the feed area 50.

Figure 2:
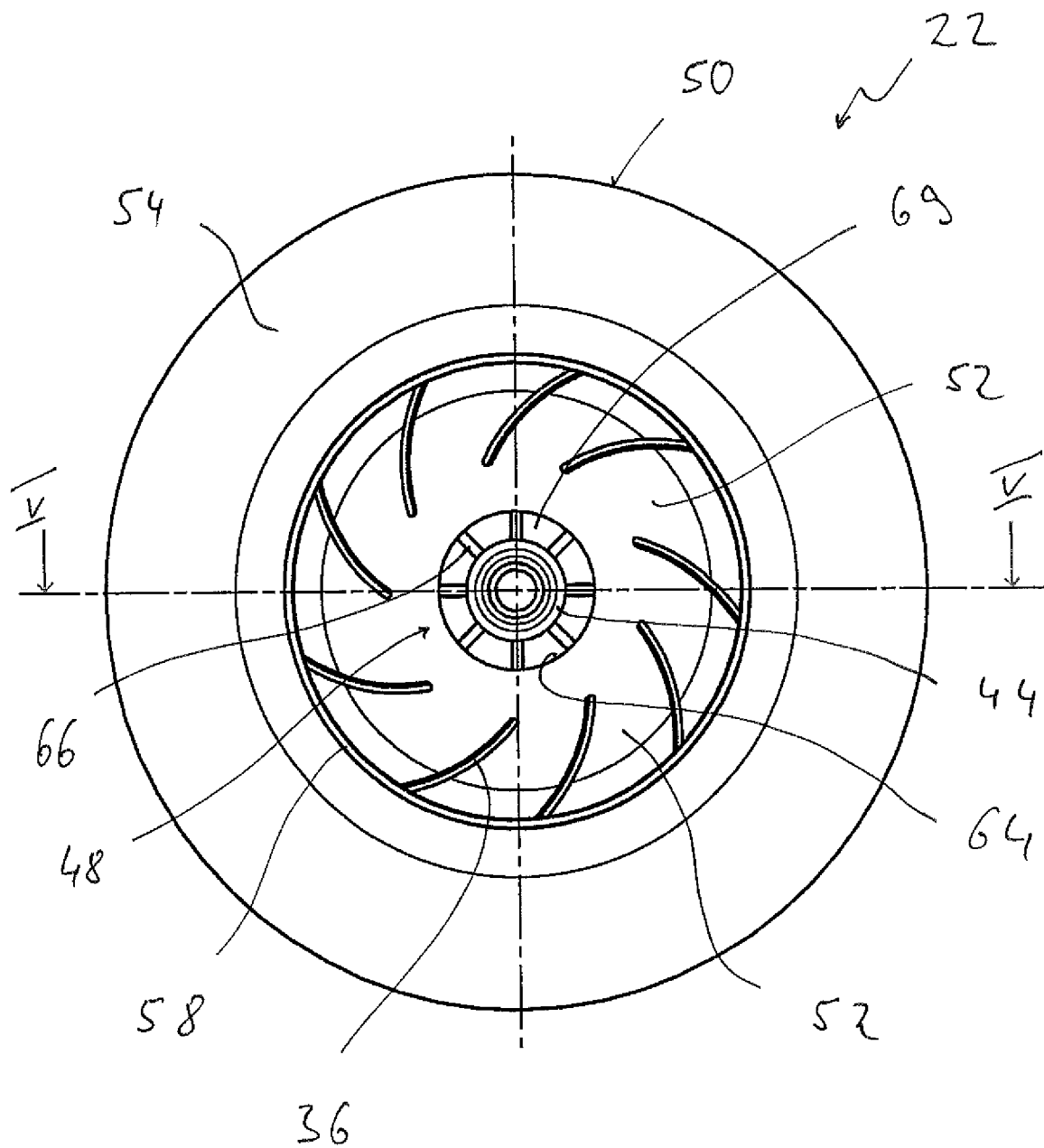
FIG. 2 is an axial view of a hot air feed wheel for a vehicle heater, viewed from a side to be positioned facing away from a blower motor.
Figure 3:
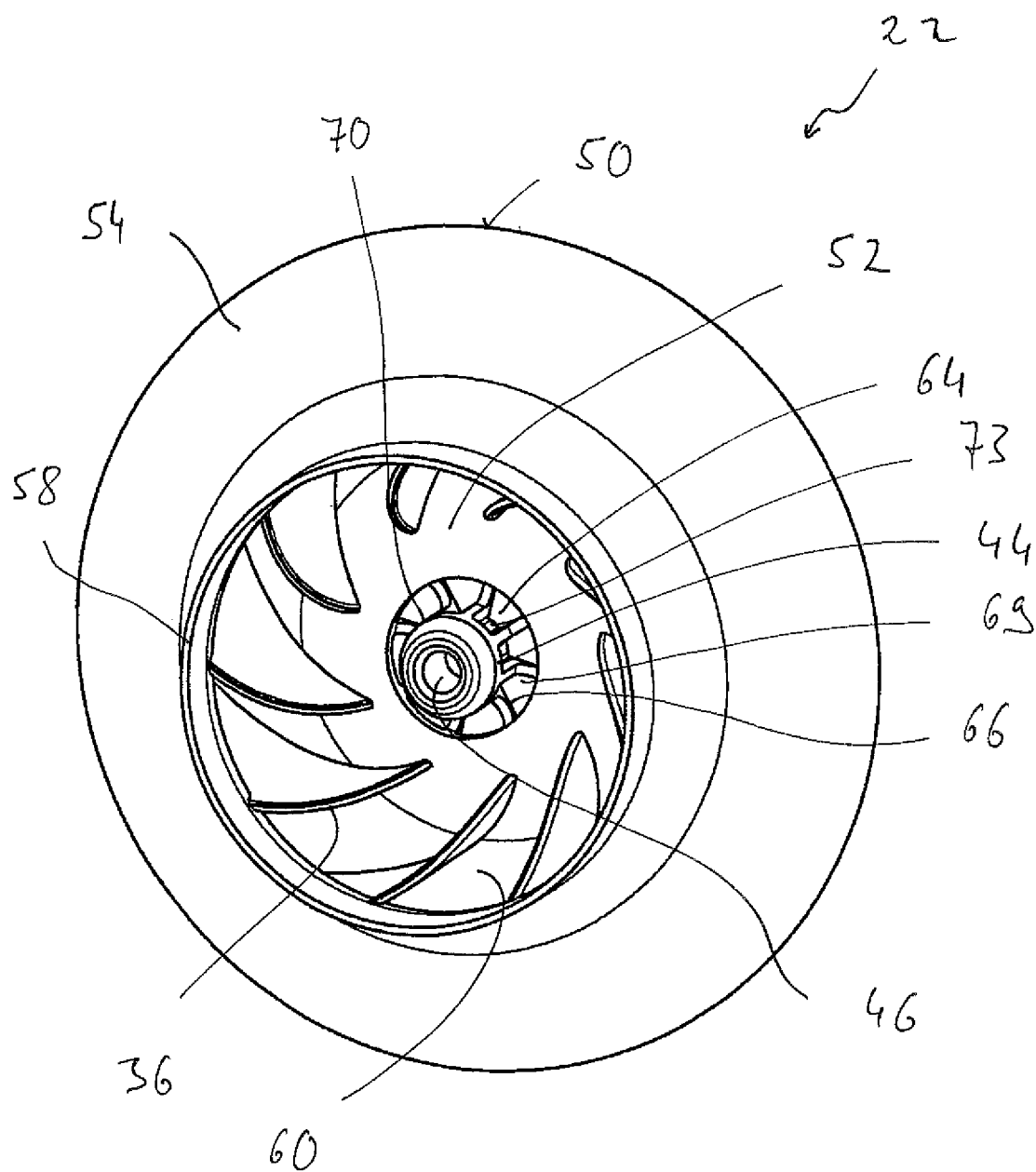
FIG. 3 is a perspective view of the hot air feed wheel of FIG. 2, viewed from the side to be positioned facing away from a blower motor.
Figure 4:
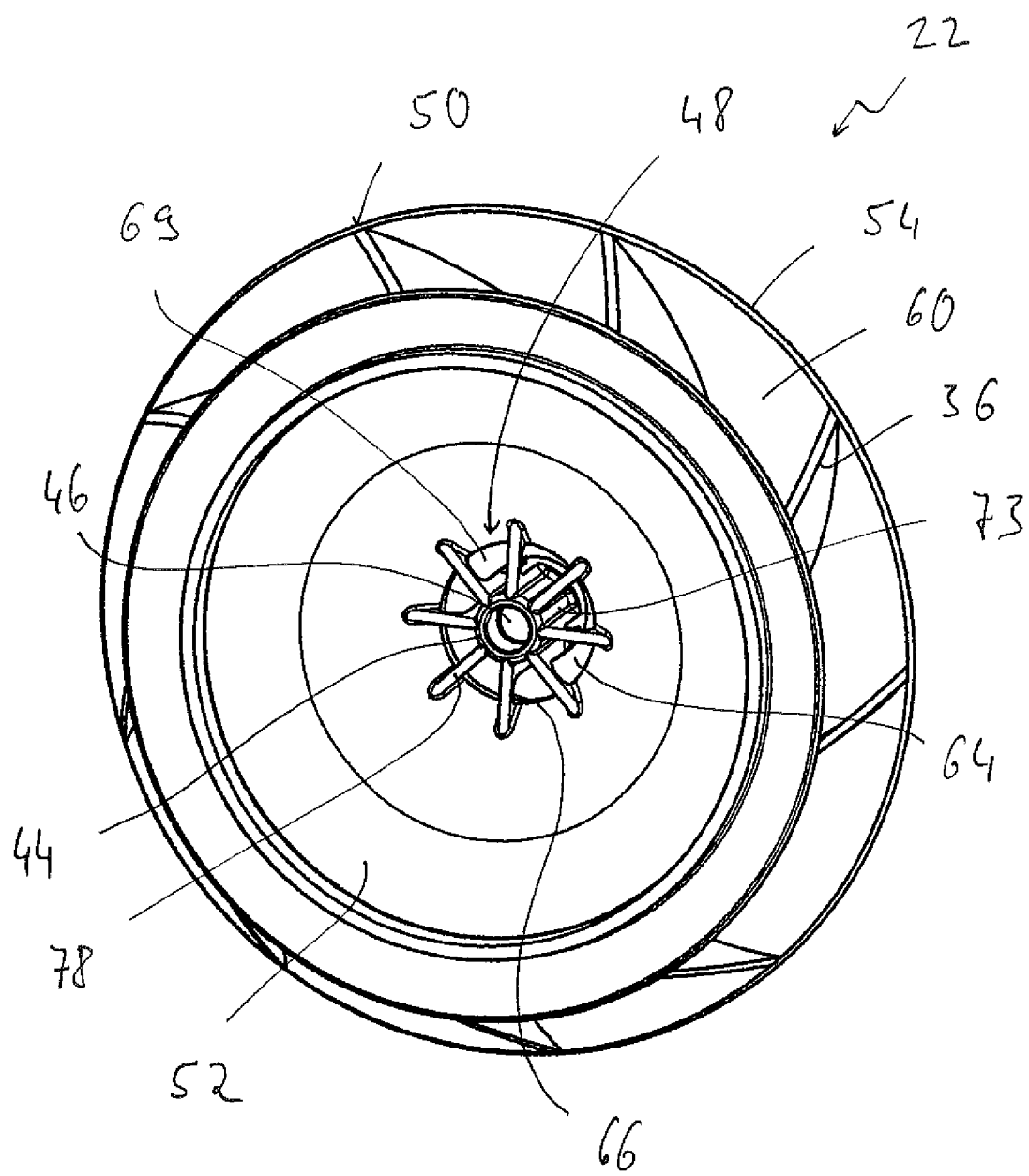
FIG. 4 is another perspective view of the hot air feed wheel of FIG. 2, viewed from a side to be positioned facing a blower motor.
Figure 5:
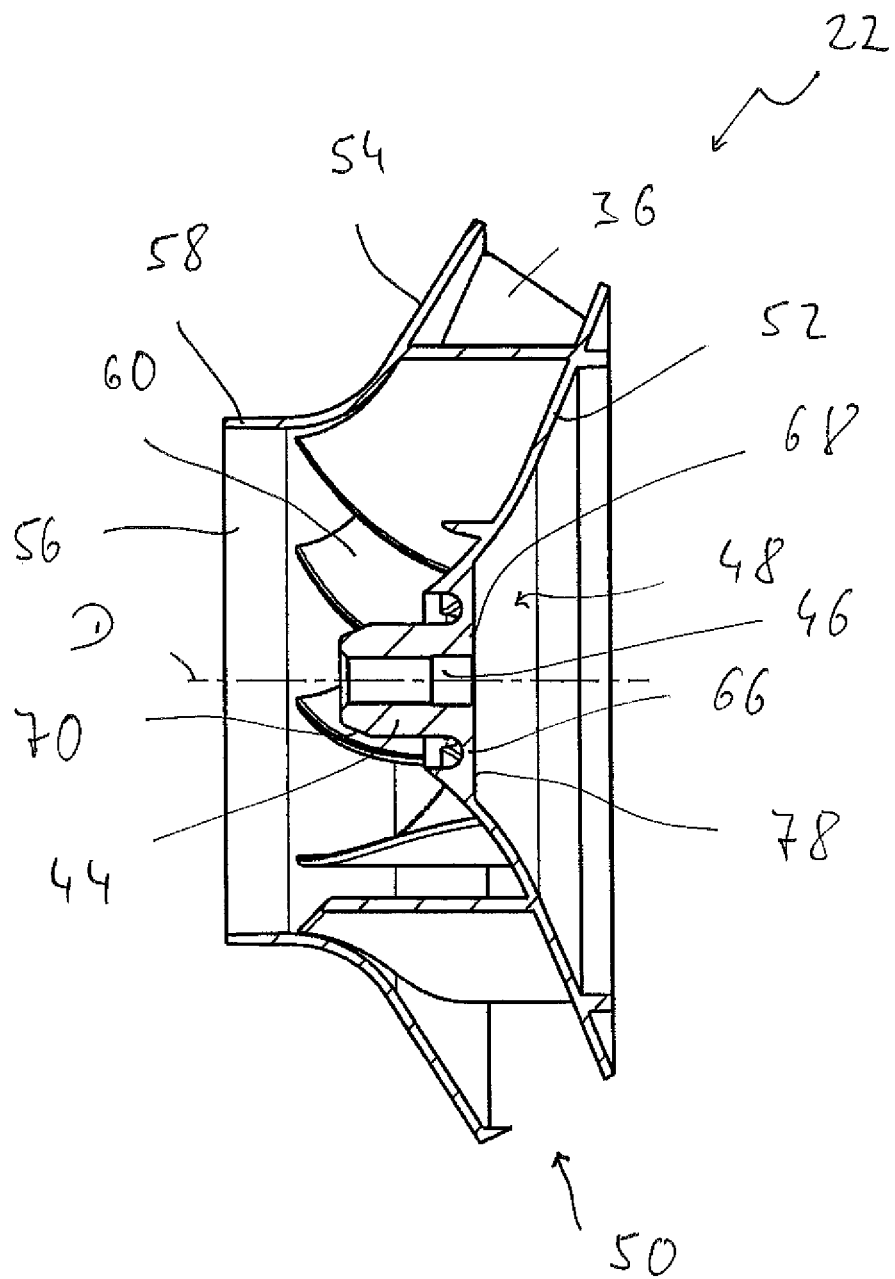
FIG. 5 is a longitudinal sectional view of the hot air feed wheel of FIG. 2, cut along a line V-V in FIG. 2.

As can be seen especially in FIGS. 2-4, a plurality of intermediate spaces 69, through which air entering into the hot air feed wheel 22 via the hot air receiving opening 56 in the direction towards the blower motor could escape, are formed because of the connection of the feed area 50 via the connection webs 66 to the hub 44 between the central area of the feed area 50 and the hub 44. This would impair the feed efficiency of the hot air feed wheel 22 or generally of a hot air blower such as the hot blower 20 configured with the hot air feed wheel 22 of the invention. In order to avoid this, the intermediate spaces 69 formed between the connection webs 66 or the radially inner end area of the first wall 52 and the outer circumferential surface 70 of the hub 44 are filled with filler 72. This filler 72, which can be seen in FIGS. 6 and 7, which may be, for example, a two-component elastomer material, is selected such that it has a higher modulus of elasticity than the material of which the hub 44 is made or the material of which the feed area 50 is made and the material of which the connection webs 66 are made. The filler 72 thus does not impair the vibration isolation functionality introduced due to the configuration of the transition area 48 according to the present invention. Rather, it permits a relative motion between the feed area 50 and the hub 44 and introduces a muffling functionality because of its elasticity and deformability, so that the transmission of vibrations from the hub 44 to the feed area 50 via the connection webs 66 is suppressed even further. To increase the connection strength of the filler 72 at the hub 44, radial recesses 73, into which the filler 72 penetrates during the filling in of the intermediate spaces 69, are formed at the hub 44 between the connection webs 66 in the circumferential direction. After the curing of the filler 72, a positive locking to the hub 44, which is more effective in the circumferential direction and in the axial direction, is thus also generated.

In order to guarantee a defined and essentially unobstructed flow of hot air to be fed through the hot air feed wheel 22 due to the filler 72, a connecting surface 74 of the filler 72 facing the second wall 54 or the hot air receiving opening 56 is shaped or configured such that this connecting surface 74 is connected in an essentially flush, i.e., ridgeless, manner in its radially outer area, and in an essentially kink-free manner to a surface 76 of the first wall 52 facing the second wall 54.

The connecting surface 74 is then curved radially inwards in the upstream direction, i.e., towards the hot air receiving opening 56 and is connected in an essentially ridgeless and kink-free manner to the outer circumferential surface 70 of the hub 44 in its radially inner end area. The filler 72 fills in the intermediate spaces 69 filled between the hub 44, the first wall 52 and the connection webs 66, and preferably up to the connection webs 66, in the downstream direction, i.e., towards the axial end area 68 of the hub 44, so that a rear side 78 of the connection webs 66 to be positioned in the direction towards the blower motor 26 is lined up precisely with a rear side of the filler 72. In this case, the filler 72 may be provided partly extending behind radially outwards towards the first wall 52 in its radially inner end area.

The connection webs 66 are shaped such that together with the first wall 52 and the hub 44, they define the intermediate spaces 69 formed radially between the outer circumferential surface 70 of the hub 44 and the radially inner end area of the first wall 52 in an essentially arc-like manner in the axial direction. The filler 72 completely fills in these intermediate spaces and with its connecting surface 74, it connects radially outwards flush with the surface 76 of the first wall 52 and connects radially inwards to the outer circumferential surface 70 of the hub 44 in a flush or ridgeless manner, the outer circumferential surface 70 of the hub 44 being shaped in a surface section 80 connecting to the connecting surface 74 or continuing same such that it continues the connecting surface 74 in an essentially kink-free manner in the direction towards an upstream end area 82 of the hub 44. An essentially smooth running, kink-free and ridgeless surface, along which the hot air flowing through the feed ducts 60 is fed radially outwards, is provided due to the surface section 80, the connecting surface 74 and the surface 76.

While specific embodiments of the invention have been shown and described in detail to illustrate the application of the principles of the invention, it will be understood that the invention may be embodied otherwise without departing from such principles.

What is claimed is:

1. A hot air feed wheel for a vehicle heater, the hot air feed wheel comprising: a hub to fix the hot air feed wheel to a drive shaft of the vehicle heater; a feed area in connection with the hub, the feed area having a plurality of feed blades arranged following one another in the circumferential direction about a feed wheel longitudinal axis; a transition area radially between the hub and the feed area and comprising a plurality of connection webs connected to the hub and the feed area, and following one another about the feed wheel longitudinal axis in a circumferential direction; wherein the feed area, the hub, and the connection webs are configured as a unitary molded plastic part, the transition area defining intermediate spaces of the unitary molded plastic part formed between the hub, the feed area and the connection webs, the intermediate spaces being openings allowing the escape of air through the unitary molded plastic part, wherein, for avoiding the escape of air entering the hot air fed wheel, the intermediate spaces of the unitary molded plastic part are filled at least partly with a filler material having a greater modulus of elasticity than a material of which the unitary molded plastic part is made, wherein the filler material provides a connecting surface oriented facing the hot air receiving opening, the connecting surface extending between the hub and a first wall, the connecting surface being connected kink-free to a surface of the first wall facing the feed blades in its radially outer end area and being connected kink-free to an outer circumferential surface the hub in its radially inner end area.

2. A hot air feed wheel in accordance with claim 1, wherein the unitary molded plastic part is made of thermoplastic elastomer material.

3. A hot air feed wheel in accordance with claim 1, wherein the feed area comprises:
   a first wall with a central hub connection opening, wherein the first wall has an umbrella-shaped configuration and which is connected to the hub via the connection webs; and
   a second wall with a central hot air receiving opening, wherein the second wall is arranged at an axial distance to the first wall and has an umbrella-shaped configuration, the feed blades extending from radially inwards to radially outwards between the first wall and the second wall such that a hot air feed duct, which is open to the hot air receiving opening, is defined by two feed blades following one another in the circumferential direction, by the first wall and by the second wall.

4. A hot air feed wheel in accordance with claim 3, wherein the hub extends through the hub connection opening.

5. A hot air feed wheel in accordance with claim 3, wherein:
the filler material provides a connecting surface oriented facing the hot air receiving opening, extending between the hub and the first wall;
the connecting surface is connected essentially ridgeless or kink-free or both ridgeless and kink-free to a surface of the first wall facing the feed blades in its radially outer end area, or is connected in an essentially ridgeless or kink-free or both ridgeless and kink-free to the hub, or is connected essentially ridgeless or kink-free or both ridgeless and kink-free to a surface of the first wall facing the feed blades in its radially outer end area, and is connected in an essentially ridgeless or kink-free or both ridgeless and kink-free to the hub.

6. A hot air feed wheel in accordance with claim 5, wherein the connecting surface is connected to an outer circumferential surface of the hub in a hub radially inner end area of the connecting surface.

7. A hot air feed wheel in accordance with claim 4, wherein:
the filler material provides a connecting surface oriented facing the hot air receiving opening, extending between the hub and the first wall;
the connecting surface is connected essentially ridgeless or kink-free or both ridgeless and kink-free to a surface of the first wall facing the feed blades in its radially outer end area, or is connected in an essentially ridgeless or kink-free or both ridgeless and kink-free to the hub, or is connected essentially ridgeless or kink-free or both ridgeless and kink-free to a surface of the first wall facing the feed blades in its radially outer end area, and is connected in an essentially ridgeless or kink-free or both ridgeless and kink-free to the hub.

8. A hot air feed wheel in accordance with claim 1, wherein:
the material of the unitary molded plastic part is not present in the intermediate spaces.

9. The hot air feed wheel in accordance with claim 1, wherein radial recesses are formed in the hub between the connecting webs in the circumferential direction, the radial recesses being filled with the filler material.

10. The hot air feed wheel in accordance with claim 1, wherein the connecting webs extend in a radial direction starting from a blower motor facing axial end area of the hub.

11. The hot air feed wheel in accordance with claim 1, wherein the intermediate spaces formed radially between an outer circumferential surface of the hub and a radially inner end area of the first wall of the feed area are defined by the connecting webs in an arc-like manner.

12. A vehicle heater, comprising:
a blower motor;
a motor shaft rotatable about a rotation axis; and
a hot air feed wheel supported at a first axial end area of the motor shaft, the hot air feed wheel comprising:
a hub to fix the hot air feed wheel to a drive shaft of the vehicle heater;
a transition area comprising a plurality of connection webs connected to the hub and following one another about the feed wheel longitudinal axis in a circumferential direction; and
a feed area adjacent to the hub and to the transition area, the feed area having a plurality of feed blades arranged following one another in the circumferential direction about a feed wheel longitudinal axis, wherein the feed area, the hub, and the connection webs are configured as a unitary molded plastic part, the transition area defining intermediate spaces of the unitary molded plastic part formed between the hub, the feed area and the connection webs, the intermediate spaces being openings allowing the escape of air through the unitary molded plastic part,
wherein, for avoiding the escape of air entering the hot air fed wheel, the intermediate spaces of the unitary molded plastic part are filled at least partly with a filler material having a greater modulus of elasticity than a material of which the unitary molded plastic part is made.

13. A vehicle heater in accordance with claim 12, further comprising a combustion air feed wheel supported at a second axial end area of the motor shaft.

14. A vehicle heater in accordance with claim 13, wherein the unitary molded plastic part is made of thermoplastic elastomer material.

15. A vehicle heater in accordance with claim 13, wherein the feed area comprises:
a first wall with a central hub connection opening, wherein the first wall has an umbrella shaped configuration and which is connected to the hub via the connection webs; and
a second wall with a central hot air receiving opening, wherein the second wall is arranged at an axial distance to the first wall and has an umbrella shaped configuration, the feed blades extending from radially inwards to radially outwards between the first wall and the second wall such that a hot air feed duct, which is open to the hot air receiving opening, is defined by two feed blades following one another in the circumferential direction, by the first wall and by the second wall.

16. A vehicle heater in accordance with claim 15, wherein the hub extends through the hub connection opening.

17. A vehicle heater in accordance with claim 15, wherein:
the filler material provides a connecting surface oriented facing the hot air receiving opening, extending between the hub and the first wall;
the connecting surface is connected essentially ridgeless or kink-free or both ridgeless and kink-free to a surface of the first wall facing the feed blades in its radially outer end area, or is connected in an essentially ridgeless or kink-free or both ridgeless and kink-free to the hub, or is connected essentially ridgeless or kink-free or both ridgeless and kink-free to a surface of the first wall facing the feed blades in its radially outer end area, and is connected in an essentially ridgeless or kink-free or both ridgeless and kink-free to the hub.

18. A vehicle heater in accordance with claim 17, wherein the connecting surface is connected to an outer circumferential surface of the hub in a hub radially inner end area of the connecting surface.

19. A vehicle heater in accordance with claim 12, wherein:

the material of the unitary molded plastic part is not present in the intermediate spaces.

20. An air feed wheel for a heater, the air feed wheel comprising:

a hub configured to fix the air feed wheel to a drive shaft of the heater;

a transition area connected to said hub, said transition area including a plurality of connection webs radially extending from said hub, each of said plurality of connection webs being spaced from each other in a circumferential direction of said hub;

a feed area connected to said transition area, said feed area having a plurality of feed blades arranged spaced from each another in the circumferential direction, said feed area, said hub, and said connection webs being formed as a unitary molded plastic part;

said hub, said feed area and said plurality of connection webs defining a plurality of intermediate spaces extending from one axial end of said unitary molded plastic part to another axially opposite axial end;

a filler material arranged in said plurality of intermediate spaces, said filler material having a greater modulus of elasticity than a material of said unitary molded plastic part.

21. An air feed wheel in accordance with claim 20, wherein:

said material of said hub, said feed area and said plurality of connection webs is not present in said intermediate spaces.

\* \* \* \* \*